US010722743B2

(12) United States Patent
Landers et al.

(10) Patent No.: US 10,722,743 B2
(45) Date of Patent: Jul. 28, 2020

(54) MULTICATALYST POLYELECTROLYTE MEMBRANES AND MATERIALS AND METHODS UTILIZING THE SAME

(71) Applicant: Rutgers, The State University of New Jersey, New Brunswick, NJ (US)

(72) Inventors: John Landers, Riverton, NJ (US); Alexander V. Neimark, Princeton, NJ (US); Tewodros Asefa, Princeton, NJ (US); Aleksey Vishnyakov, North Brunswick, NJ (US); Anandarup Goswami, Riverton, NJ (US); Jonathan Colon Ortiz, Highland Park, NJ (US)

(73) Assignee: RUTGERS, THE STATE UNIVERSITY OF NEW JERSEY, New Brunswick, NJ (US)

( * ) Notice: Subject to any disclaimer, the term of this patent is extended or adjusted under 35 U.S.C. 154(b) by 0 days.

(21) Appl. No.: 15/154,219

(22) Filed: May 13, 2016

(65) Prior Publication Data

US 2017/0007871 A1    Jan. 12, 2017

Related U.S. Application Data

(60) Provisional application No. 62/162,402, filed on May 15, 2015.

(51) Int. Cl.
| | | |
|---|---|---|
| *H01M 4/90* | (2006.01) |
| *A62D 5/00* | (2006.01) |
| *C08J 7/06* | (2006.01) |
| *C08J 5/22* | (2006.01) |
| *B01J 35/06* | (2006.01) |
| *B01J 31/38* | (2006.01) |
| *B01J 31/34* | (2006.01) |
| *B01J 31/28* | (2006.01) |
| *B01J 35/00* | (2006.01) |
| *D06M 11/46* | (2006.01) |
| *D06M 15/356* | (2006.01) |
| *B01J 37/02* | (2006.01) |
| *D06M 15/227* | (2006.01) |
| *B01J 27/188* | (2006.01) |
| *D06M 15/233* | (2006.01) |
| *B01J 23/06* | (2006.01) |
| *D06M 11/49* | (2006.01) |
| *D06M 11/50* | (2006.01) |
| *D06M 11/44* | (2006.01) |
| *D06M 16/00* | (2006.01) |
| *D06M 11/45* | (2006.01) |
| *D06M 15/256* | (2006.01) |
| *D06M 23/08* | (2006.01) |
| *C08J 7/04* | (2020.01) |
| *B01J 31/06* | (2006.01) |
| *B01J 31/10* | (2006.01) |
| *B01J 37/03* | (2006.01) |

(52) U.S. Cl.
CPC ............... *A62D 5/00* (2013.01); *B01J 23/06* (2013.01); *B01J 27/188* (2013.01); *B01J 31/28* (2013.01); *B01J 31/34* (2013.01); *B01J 31/38* (2013.01); *B01J 35/0013* (2013.01); *B01J 35/06* (2013.01); *B01J 35/065* (2013.01); *B01J 37/0219* (2013.01); *C08J 5/225* (2013.01); *C08J 5/2243* (2013.01); *C08J 5/2275* (2013.01); *C08J 5/2281* (2013.01); *C08J 7/0423* (2020.01); *C08J 7/06* (2013.01); *D06M 11/44* (2013.01); *D06M 11/45* (2013.01); *D06M 11/46* (2013.01); *D06M 11/49* (2013.01); *D06M 11/50* (2013.01); *D06M 15/227* (2013.01); *D06M 15/233* (2013.01); *D06M 15/256* (2013.01); *D06M 15/3566* (2013.01); *D06M 16/00* (2013.01); *D06M 23/08* (2013.01); *B01J 31/06* (2013.01); *B01J 31/10* (2013.01); *B01J 37/0211* (2013.01); *B01J 37/035* (2013.01); *C08J 2327/18* (2013.01); *C08J 2353/02* (2013.01); *C08J 2400/12* (2013.01); *D06M 2400/02* (2013.01)

(58) Field of Classification Search
None
See application file for complete search history.

(56) References Cited

U.S. PATENT DOCUMENTS

| | | | | |
|---|---|---|---|---|
| 4,396,687 A * | 8/1983 | Kummer | ................. | H01M 8/20 429/417 |
| 5,510,394 A * | 4/1996 | Hodgdon | ............... | C08J 5/2243 210/500.27 |
| 7,449,111 B2 * | 11/2008 | Hedhli | ............... | C08G 18/0828 210/500.27 |
| 2008/0096093 A1 * | 4/2008 | Jang | .................... | H01M 4/8663 429/483 |
| 2009/0208809 A1 * | 8/2009 | Hamrock | ............ | H01M 8/1023 429/492 |
| 2010/0222528 A1 * | 9/2010 | Fushimi | .................. | C08F 10/02 526/123.1 |

FOREIGN PATENT DOCUMENTS

| | | | | |
|---|---|---|---|---|
| WO | WO 2007/110663 | * 10/2007 | ............. | H01M 8/20 |
| WO | WO 2007110663 | * 10/2007 | ............. | H01M 8/20 |

OTHER PUBLICATIONS

Zhdanov, A.A., et al., "Application of Capillary Electrophoresis and High Performance Liquid Chromatography in the Study of Polyoxometalate Complexes" Journal of Structural Chemistry (2014) 55(6):1128-1133.

(Continued)

*Primary Examiner* — Yun Qian
(74) *Attorney, Agent, or Firm* — Robert C. Netter, Jr.; Dann, Dorfman, Herrell & Skillman

(57) ABSTRACT

A multi-catalytic material that includes a polyelectrolyte membrane and methods of preparing the same are provided herein.

25 Claims, No Drawings

(56) References Cited

OTHER PUBLICATIONS

Tsigdinos, G.A., et al., "Molybdovanadophosphoric Acid and Their Salts: Investigation of Methods of Preparation and Characterization" Inorganic Chem. (1968) 7(3): 437-441.

Neumann, R., et al., "Aerobic Oxidative Dehydrogenations Catalyzed by the Mixed-Addenda Heteropolyanion PV2Mo10O40 5-: A Kinetic and Mechanistic Study" J. Am. Chem. Soc. (1992) 114:7278-7286.

Romanenko, I., et al., "POMbranes: polyoxometalate-functionalized block copolymer membranes for oxidation catalysis" J. Mater. Chem. A (2017) 5:15789.

Giannakoudakis, et al., "Polyoxometalate hybrid catalyst for detection and photodecomposition of mustard gas surrogate vapors" Applied Surface Science (2019) 467-468:428-438.

Colon-Ortiz, et al., "Disordered Mesoporous Zirconium (Hydr)Oxides for Decomposition of Dimethyl Chloro-Phosphate" ACS Appl. Mater. Interfaces (2019) DOI: 10.1021/acsami.9b00843.

\* cited by examiner

MULTICATALYST POLYELECTROLYTE MEMBRANES AND MATERIALS AND METHODS UTILIZING THE SAME

This application claims priority under 35 U.S.C. § 119(e) to U.S. Provisional Patent Application No. 62/162,402, filed May 15, 2015. The foregoing application is incorporated by reference herein.

This invention was made with government support under HDTRA 1-11-16-BRCWMD-BAA awarded by the Defense Threat Reduction Agency. The government has certain rights in the invention.

FIELD OF THE INVENTION

The present invention relates generally to catalyst-bearing polymeric materials and more particularly, but not exclusively, to multicatalytic materials that contain polyelectrolyte membranes.

BACKGROUND OF THE INVENTION

The development and use of novel polymeric membranes as suitable permselective diffusion barriers has been an engineering challenge in the area of new protective materials. These membranes must provide high water vapor permeability and be impermeable to chemical warfare agents (CWA).

The present invention provides solutions to the challenges in the field by providing multicatalyst polyelectrolyte membrane (MC-PEM) containing materials that may transmit water vapor therethrough. These materials may further prevent the transmission of chemical warfare agents (CWAs) through such materials by decomposing and/or degrading the CWAs.

SUMMARY OF THE INVENTION

The present invention includes a multi-catalytic material that may degrade, decompose, and otherwise render inert CWAs. The material of the invention may include a polyelectrolyte membrane (PEM). Moreover, the material of the invention may include a polyoxometalate (POM). The material of the invention may also include a metal oxide (MO).

In certain embodiments, the multi-catalytic materials of the invention may include PEM, having a POM disposed or applied to an outer surface of the PEM. The PEM may also include an MO disposed interior to the PEM.

In another aspect, the present invention may include a self-decontaminating cloth that includes the multi-catalytic material of the invention, which may, for example, decompose a CWA while transmitting water vapor therethrough.

The materials of the invention may be useful in degrading, decomposing, or otherwise rendering inert a variety of CWAs, including, but not limited to, G-agents, H-agents, and V-agents, as set forth herein.

DETAILED DESCRIPTION OF THE INVENTION

The present invention encompasses multi-catalytic materials that may include a polyelectrolyte membrane (PEM), a polyoxometalate (POM); and/or a metal oxide (MO). The materials of the invention provide solutions in the field as materials for preventing the transmission of CWAs therethrough by degrading or otherwise decomposing such CWAs. These materials or membranes provide high water vapor permeability and are impermeable to CWAs. Such multi-catalytic materials of the invention may have multiple layers with metal catalysts (e.g., POMs and/or MOs) disposed at those layers, interior to the PEM of the material.

In addition, the multi-catalytic materials of the invention may have an outer surface (e.g., configured to face and interact with CWAs) and an inner surface (e.g., configured to face a wearer of such material and receive water vapor for transmission). The outer surfaces of the multi-catalytic materials may have metal catalysts (e.g., POMs and/or MOs) disposed thereon. For example, the multi-catalytic materials of the invention may have certain metal catalysts disposed at an outer surface while having metal catalysts (the same or different) disposed interior to or otherwise placed within the material (e.g., interior to the PEM of the materials of the invention). In certain embodiments, an outer surface or portion of the materials of the invention may oxidize a molecule, which may be an oxidative substrate, for example. In addition, or alternatively thereto, the materials of the invention may have an interior portion that may hydrolyze a molecule, which may be a hydrolytic substrate, for example. Moreover, the materials of the invention may transmit water vapor through the material while inhibiting the transmission of CWAs.

Regarding the PEM of the invention, such membrane may represent the bulk of the material of the invention. The PEM may be composed of a polymer. As used herein, the term "polymer" refers to the product of a polymerization reaction, and is inclusive of homopolymers, copolymers, terpolymers, etc. As used herein, the term "homopolymer" refers to a polymer resulting from the polymerization of a single monomer, i.e., a polymer consisting essentially of a single type of repeating unit. Furthermore, as used herein, the term "copolymer" refers to polymers formed by the polymerization reaction of at least two different monomers and, moreover, the term copolymer is inclusive of random copolymers, block copolymers, graft copolymers, etc. As used herein, the term "terpolymer," refers to a polymer that includes at least three monomers.

In certain instances, the PEM may include a block copolymer having hydrophobic units or blocks and hydrophilic units or blocks of hydrophobic polymers and hydrophilic polymers, respectively. In other words, the PEM may be amphiphilic. Indeed, the PEM of the invention may include a diblock copolymer or a triblock copolymer, for example. The blocks of certain embodiments of the invention may have a molecular weight, for example of between about 1 kD to about 500 kD. In other embodiments, the blocks of certain embodiments of the invention may have a molecular weight of about 10 kD to about 100 kD. In specific examples, different blocks of the material make up the block copolymers of the invention may have varying molecular weights. For example, certain copolymers of the invention may have a first block having a molecular weight of about 10-20 kD with a second block having a molecular weight of about 50-100 kD.

The hydrophobic and hydrophilic units may have varying morphologies, as needed to adjust the properties of the resulting polymers, and may include linear morphologies, branched morphologies, or combinations thereof. Moreover, such hydrophobic and hydrophilic units may have a length that may be adjusted, as understood by a person having ordinary skill in the art, to tune the desired properties of the resulting polymeric materials. The PEM may be ionic. The PEM may include portions in which an ion exchange may occur. Therefore, the PEM may include ion exchanging functional groups, such as, for example, sulfite, sulfate, and the like. For example, the ion exchanging functional group may be $SO_3^-$, but the ion exchanging functional group may be any suitable anionic functional group, as would be understood by a person having ordinary skill in the art.

In particular aspects, the PEM may include a sulfonated tetrafluoroethylene based fluoropolymer-copolymer (e.g., a polymer having a polytetrafluoroethylene backbone (hydrophobic) with side chains comprising a sulfonic acid group (such as the side chain depicted below); e.g., Nafion® (e.g., Nafion® 112, Nafion® 117, etc.)), sulfonated styrene-ethane/butadiene-styrene (sSEBS), or a combination thereof. In a particular embodiment, the PEM may include a sulfonated tetrafluoroethylene based fluoropolymer-copolymer (e.g., Nafion®).

An example of a sulfonated tetrafluoroethylene based fluoropolymer-copolymer (e.g., Nafion®) is a compound of the formula:

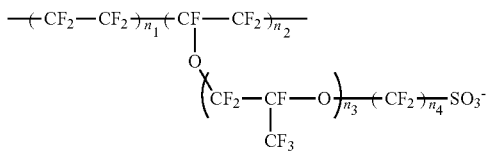

wherein each of $n_1$, $n_2$, $n_3$, and $n_4$ is independently selected from 1 to about 20. In a particular embodiment, each of $n_1$, $n_2$, $n_3$, and $n_4$ is independently selected from 1 to about 15 or from 1 to about 10. In a particular embodiment, $n_1$ is from 1 to about 15, from 1 to about 10, from about 5 to about 10, or from 6 to 10. In a particular embodiment, $n_2$ is from 1 to about 15 or from 1 to about 10, from 1 to about 5, from 1 to about 3, or is 1. In a particular embodiment, $n_3$ is from about 1 to about 3 or is 1. In a particular embodiment, $n_4$ is from 1 to about 5, from 1 to about 3, or is 2. The compound of the above group may be altered such that the $n_z$ group may be substituted with the depicted $n_1$ group, so long as the resultant polymer has at least one side chain (the $n_2$ group as depicted).

An example of a sulfonated styrene-ethane/butadiene-styrene (sSEBS) is a triblock copolymer comprising terminal blocks of

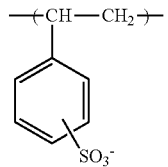

and a central block of

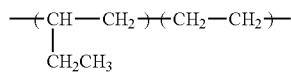

In a particular embodiment, each end block is independently about 10 to about 20 kD and the middle block is about 50 to about 100 kD.

The PEM may also include a counterion (e.g., a cationic counterion) that may associate with the ion exchanging functional group. For example, the cation may include one or more monovalent cations, bivalent cations, trivalent cations, tetravalent cations, pentavalent cations, hexavalent cations, or a combination thereof. Indeed, the cation may be one or more of $K^+$, $Na^+$, $Mg^{2+}$, $Ca^{2+}$, $Zn^{2+}$, $Ni^{2+}$, $Co^{2+}$, $Co^{3+}$, $Fe^{2+}$, $Fe^{3+}$, $Al^{2+}$, $Al^{3+}$, $Mn^{2+}$, $W^{2+}$, $Cr^{2+}$, $Cr^{3+}$, $Zr^{2+}$, $Y^{3+}$, $Nb^{2+}$, $Mo^{1+}$, $Mo^{2+}$, $Mo^{3+}$, $Mo^{4+}$, $Mo^{5+}$, $Mo^{6+}$, or a combination thereof. In a particular embodiment, the counterion is $Fe^{3+}$ or $Ca^{2+}$.

Regarding the POMs of the invention, such POMs may be on the exterior and/or in the interior of the multi-catalytic material. In a particular embodiment, the POMs may be disposed at a surface of the PEM. In certain aspects of the invention, the POMs are disposed at a surface of the PEM in order to preferentially interact with specific CWAs that may be decomposed or degraded by the POMs. In a particular embodiment, a solution of POM with a polymer is dropcast and then dried.

The POMs of the invention may include the building blocks of $MO_4$, $MO_5$, or $MO_6$, where M may be a metal from the periodic table (e.g., the d-block metals). Such POMs may include POM nanoparticles and/or nanoclusters that may be disposed at a surface of the PEM. In a particular embodiment, the diameter or longest dimension of the POM nanoparticle or nanocluster is about 0.1 to about 250 nm, about 0.1 nm to about 200 nm, about 0.5 nm to about 150 nm, about 0.5 nm to about 100 nm, or about 0.5 nm to about 10 nm. In a particular embodiment, the average size is less than 10 nm. In certain embodiments of the invention, the POMs may be Keggin polyoxometalates.

In certain embodiments, the POMs of the invention may have the structure of $Y[XM_{12}O_{40}]^{n-}$, where X is a heteroatom that may be, for example, V, Mo, W, Nb, Ta, P, and/or K; M may be a d-block metal; n is an integer from about 1 to 10; and Y may be one or more positively charged counterions, including, but not limited to, $Na^+$, $K^+$, $NH_4^+$, and the like. In certain embodiments, M may be Co or W. In certain other embodiments, the POM may be $K_5Co^{III}W_{12}O_{40}$, $K_9[(Fe(H_2O)_2)_3(PW_9O_{24})_2]$, $V_2Mo_{10}O_{40}$, and/or $(NH_4)_3PW_{12}O_{40}$. In a particular embodiment, the POM is $K_5Co^{III}W_{12}O_{40}$.

Referring to the POMs more generally, the counterions (Y) used in the above-referenced formula may serve as the counterions with any atom, as would be understood by a person having ordinary skill in the art, or combination thereof from the periodic table that may be capable of balancing the charge of associated anion. Moreover, the size of the POM may range from a single building block on the Angstrom scale (e.g., $MO_4$), up to, or exceeding, nanometer sized POM (e.g., $[H_xMo_{360}O_{1032}(H_2O)_{240}(SO_4)_{48}]^{48-}$, $\{Mo_{368}\}$) or greater.

The present materials of the invention may include MOs that may be disposed within the material and/or interior to the PEM. The MOs of the invention may further include MO nanoparticles, such as, for example, clusters, alloys, core-shell particles, or a combination thereof. An MO nanoparticle will generally be up to about 1 µm in diameter (e.g., z-average diameter). In a particular embodiment, the diameter or longest dimension of the nanoparticle is about 1 to about 500 nm, about 5 nm to about 250 nm, about 5 nm to about 200 nm, about 5 nm to about 150 nm, or about 10 nm to about 100 nm.

MOs may be introduced into the materials of the invention (e.g., introduced into or at the PEM used in the invention) as MOs or as MO precursors during the preparation of the materials of the invention. As used herein, the term "metal oxide precursor" or "MO precursor" may include any metal and oxygen containing salts or complexes that allow for the introduction of an MO and may encompass metal carbonates, metal halides, metal nitrates, metal sulfates, metal nitrites, metal sulfites, metal phosphites, metal phosphates, metal acetates, metal hydroxides, metal hydrated oxides, metal oxohydroxides, metal oxoperoxohydroxides, and the like. The MOs of the invention may include, for example, $Al_2O_3$, ZnO, MgO, CaO, $TiO_2$, $Co_2O_3$, $Fe_2O_3$, NiO, $Ni_2O_3$, $Ag_2O$, AgO, $Ag_2O_3$, CoO, $Co_2O_3$, $Co_3O_4$ or a combination thereof. The MO precursors of the invention that may result in the introduction of an MO may include, for example, $AgNO_3$, $Ni(NO_3)_2$, $Fe(NO_3)_3$, $Co(NO_3)_2$, $Zn(NO_3)_2$, or the like (e.g., nitrates of the MO). In a particular embodiment, the MO is selected from the group consisting of ZnO, MgO, $Al_2O_3$, CaO, $TiO_2$, and $Fe_2O_3$. In a particular embodiment, the MO is selected from the group consisting of ZnO, MgO, and $Fe_2O_3$. In a particular embodiment, the MO is ZnO.

The materials of the invention may further include a polyelectrolyte coating disposed on a surface (e.g., the outer surface) of the material. Indeed, the polyelectrolyte coating may be disposed on the outer surface of the PEM and may be configured to overlay the material. The polyelectrolyte coating may include any positively charged polyelectrolyte known by a person having ordinary skill in the art (e.g., chitosan of PDDA). The polyelectrolyte coating may further include an additional polymer component that may enhance a particular property of the polyelectrolyte coating. For example, the polyelectrolyte coating may include polyvinyl alcohol (PVA) by crosslinking to increase the strength of the polyelectrolyte coating.

In specific aspects of the invention, the multi-catalyst material may include a Nafion® PEM, a $K_5Co^{III}W_{12}O_{40}$ POM, and a ZnO or NiO MO.

The materials of the present invention may be useful in preparing self-decontaminating protective clothing and cooperative catalysts, for example. Regarding self decontaminating protective clothing, the multi-catalyst materials may be prepared as or with protective cloths. Indeed, the multi-catalyst materials may be applied to the surface of a cloth to be used in the preparation of garments that may protect a wearer from CWAs. For example, the multi-catalyst materials may be coated on fabrics (e.g., cotton) and the coating thickness may be varied as desired.

The materials of the instant invention may also comprise a conductive component in order to be made conductive. For example, the materials of the instant invention may further comprise nanotubes (e.g., carbon nanotubes), nanowries (e.g., silver nanowires), carbon fibers, or graphene. The inclusion of the conductive components results in flexible electrodes. The inclusion of conductive components also allows the material to act as a sensor for CWAs (e.g., by measuring the change in resistance in the material).

The materials of the instant invention may also comprise a plasticizer (e.g., a phthalate) in order to be made elastic and/or flexible.

The materials of the invention may degrade and/or decompose, or otherwise render harmless to a human wearer, a variety of CWAs. The materials of the invention may also be used as a chemical sensor, particularly for CWAs. In a particular embodiment, a CWA may be an agent classified as a schedule 1, 2, or 3 agent under the Chemical Weapons Convention of 1993. The CWA may be in liquid form, gas form, solid form, or combinations thereof. The CWA may be a nerve agent, blood agent, blister agent, pulmonary agent, incapacitating agent, and/or toxin. In a particular embodiment, the CWA is a nerve agent. The CWAs that may be degraded or decomposed by the invention may include, for example, G-agents, H-agents, and/or V-agents. CWAs that are G-agents include, but are not limited to, tabun, sarin, soman, cyclosarin, ethyl sarin, O-isopentyl sarin, 2-(dimethylamino)ethyl N,N-dimethylphosphoramidofluoridate, or a combination thereof. H-agents include, but are not limited to, sulfur mustard, 2-chloroethyl ethylsulfide (CEES; half mustard), or a combination thereof. V-agents include, but are not limited to, S-[2-(diethylamino)ethyl] O-ethyl ethylphosphonothioate, S-[2-(diethylamino)ethyl] O-ethyl methylphosphonothioate, 3-pyridyl 3,3,5-trimethylcyclohexyl methylphosphonate, O-isobutyl S-(2-diethaminoethyl) methylphosphothioate, ethyl ({2-[bis(propan-2-yl)amino]ethyl}sulfanyl)(methyl) phosphinate (VX), O,O-diethyl-S-[2-(diethylamino)ethyl] phosphorothioate, or a combination thereof. Other CWAs that may be degraded or decomposed by the materials of the invention may include, but are not limited to, diisopropyl fluorophosphonate, dimethyl-methylphosphonate, malathion, or a combination thereof.

Regarding the materials of the invention more broadly, research has been concentrated on segregated hydrated PEMs, whose selective transport properties are related to their inhomogenous microstructure caused by the contrast between hydrophilic and hydrophobic fragments of the polymer. Upon hydration, PEM may segregate into hydrophilic and hydrophobic subphases (Eisenberg and Yeager, eds. (1982) Perfluorinated Ionomer Membranes, American Chemical Society; Pineri and Eisenberg, eds. (1987) Structure and properties of Ionomers, Dordrecht, Holland: D. Reidel Publishing Co., 1987; Mauritz, K. A. (1988) J. Macromol. Sci., Rev. Macromol. Chem. Phys., C28:65). In certain circumstances, water may diffuse through the hydrophilic subphase, which may be composed of water and ionic groups. On the other hand, toxins, which may contain a good share of hydrophobic groups, may be trapped in the hydrophobic subphase formed by the polymer backbone.

One of the biggest challenges in the development of PEM-based protective materials comes from phosphoorganic nerve agents and originates from their molecular interactions with hydrated PEM. Phosphororganic CWA molecules may interact favorably with both water and the hydrophobic backbone of PEM (Rivin et al. (2004) J. Phys. Chem. B 108:8900-09; Lee et al. (2011) J. Phys. Chem. B 115:13617-23; Lee et al. (2013) J. Phys. Chem. B 117:365-72; Vishnyakov et al. (2008) J. Phys. Chem. B 112:14905-10).

In solving the problems in the field, the invention includes materials having self-detoxifying perm-selective multi-catalyst polyelectrolyte membranes (MC-PEM) that may include (i) nanosegregated PEMs that trap/absorb toxic agents and allow water permeability, and (ii) multicomponent catalysts (MC) that facilitate decomposition of toxic agents by hydrolysis and/or oxidation. The MC-PEMs of the invention may provide a barrier that may employ at least two different catalytic agents: metal oxide (MO) catalytic nanoclusters that may be created by sol-gel technique, and polyoxometalate (POM) catalysts deposited at the outer surface via layer-by-layer deposition. Such hierarchical architecture may resemble the complex structure of biomembranes and may provide a versatile platform for computationally aided design of optimized substrate-mediated multicatalyst systems.

The present invention deploys PEM not only as a suitable catalyst support that may provide extended reactive surface and efficient transport of the reaction components, but also as a "second skin" protective medium that may block toxins and transport water from the human body. PEM is compliant and may self-assemble while absorbing water, which may serve as one of the components of the hydrolysis catalytic reactions of agent decontamination. Furthermore, the idea of heterogeneously distributing different catalytic species within the membrane's interior and outer surface, which would communicate through the nanoscale network of water channels created within the membrane upon hydration stems from the hierarchical architecture of physiological membranes. As such, the materials of the present invention may be advantageous in a broad class of chemical engineering and biomedical applications including, but not limited to, materials for CWA protective clothing, fuel cell technologies, and the creation of multifunctional membranes for artificial organs, vessels, skin, and patches for topical delivery.

The present invention includes materials that may decompose and/or degrade CWAs, including the most common CWAs, which include, but are not limited to, phosphororganic G-type and V-type nerve agents and vesicant H-agents, of which large stockpiles still exist in many countries. Because of their extreme toxicity, CWAs are often mimicked in experiments by simulants, that is, similar compounds of low toxicity whose chemistry and transport properties are close to those of CWAs. G-agents may be mimicked by alkylphosphonates and fluorophosphates (Frishman et al. (2000) Field Anal. Chem. Tech., 4:170-94; Suzin et al. (2000) Carbon 38:1129-33; Vo-Dinh et al. (1999) Field Anal. Chem. Tech., 3:346-56). Such compounds are strongly polar, such as, for example, malathion, a simulant for V-agents (Kosolapoff et al. (1954) J. Chem. Soc., 3222-25). Agents and simulant conformations and single-molecule properties are well-explored by ab initio modeling and spectroscopy, and forcefields of standard form having been developed for classical simulations (Suenram et al. (2004) J. Mol. Spectr., 224:176-84; Suenram et al. (2002) J. Mol. Spectr., 211:110-18; Walker et al. (2001) J. Mol. Spectr., 207:77-82; Kaczmarek et al. (2004) Struct. Chem., 15:517-25; Sokkalingam et al. (2009) J. Phys. Chem. B, 113:10292-97; Vishnyakov et al. (2011) J. Phys. Chem. A, 115:5201-09). Thermodynamic properties of phosphororganic chemicals with water have been measured, while molecular interactions in vapor phase where characterized by interaction energies and IR spectra (Lee et al. (2011) J. Phys. Chem. B, 115:13617-23; Alam et al. (2015) J. Mol. Model., 21:182; Balboa et al. (2007) "Vapor Pressure of GD," U.S. Army Edgewood Biological Center: Aberdeen Proving Ground, Md.; Tevault et al. (2006) Intl. J. Thermophys., 27:486-93; Ault et al. (2004) J. Phys. Chem. A, 108:10094-98; Bizzigotti et al. (2010) Chem. Rev., 110:3850-50; Bartelt-Hunt et al. (2008) Crit. Rev. Environ. Sci. Tech., 38:112-36).

Vapor interaction energies and aqueous solutions of DMMP, DIFP, sarin, and soman have been studied with classical molecular dynamics simulations and thermodynamic experiments (Lee et al. (2011) J. Phys. Chem. B, 115:13617-23; Lee et al. (2013) J. Phys. Chem. B, 117:365-72; Vishnyakov et al. (2011) J. Phys. Chem. A, 115:5201-09; Vishnyakov et al. (2004) J. Phys. Chem. A, 108:1435-39). It has been concluded that common simulants mimic the interactions of G-agents with water reasonably well and semi-quantitatively represents a number of important properties of G-agents, such as strongly negative excess mixing volume and enthalpy. Alkylphosphonates of the same molecular size turned out generally more hydrophilic, and fluorophosphates more hydrophobic than G-agents. The aqueous solutions of the organophosphorous compounds displayed distinct non-trivial dynamic properties explained by competition of the interactions between strongly hydrophobic and hydrophilic groups.

Nafion® and sPS-based block copolymers were explored in this invention as protective PEMs. The concept of using PEM for breathable protective films originated from their nanostructure. When perfluorinated ionomers like Nafion® are exposed to water, water first forms clusters around the hydrophilic sidechains. As the water content increases, the clusters coalesce into hydrophilic aggregates, forming a hydrophilic subphase. The regions around the perfluorinated backbone form a hydrophobic subphase. The segregation morphology is generally thought to be irregular, with the segregation scale up to several nm as determined by extensive experimental studies with SAXS, SANS, NMR, DSC, ESR conductance, and IR techniques (Eisenberg and Yeager, eds. (1982) Perfluorinated Ionomer Membranes, American Chemical Society; Pineri and Eisenberg, eds. (1987) Structure and Properties of Ionomers, Dordrecht, Holland: D. Reidel Publishing Co.; Capek, I. (2005) Adv. Colloid Interface Sci., 118:73-112; Giotto et al. (2003) Macromolecules 36:4397-403; Meresi et al. (2001) Polymer 42:6153-60; Paddison, S. J. (2003) Ann. Rev. Mater. Res., 33:289-319). Transport in the hydrophilic subphase may be determined by solvent motion between the aggregates (Vishnyakov et al. (2001) J. Phys. Chem. B, 105:7830-34).

By means of sorption and permeation experiment in conjunction with molecular dynamics simulations, it has been demonstrated that a Nafion® membrane is permeable to water and hydrophilic solvents, such as 1-propanol and dimethyl methylphosphonate (Rivin et al. (2004) J. Phys. Chem. B, 108:8900-09). Sorption of DMMP and water is much less competitive than sorption of water and propanol. Cation-substituted dry Nafion® samples showed near zero DMMP permeation, but hydrated samples showed high permeability. This effect is related to a complex microphase segregation in the membranes swollen in aqueous solutions of polar solvents.

Unlike Nafion®, block ionomers such as sSEBS tend to segregate into a variety of regular (e.g., cubic, hexagonal, lamellae, etc.) and irregular morphologies determined by the block length and solvent composition (Lu et al. (1993) Macromolecules 26:3615). It is generally believed that the segregation structure of ionomers is less regular compared to that in parental non-sulfonated diblocks and triblocks (Lu et al. (1993) Macromolecules 26:3615; Kim et al. (2001) Korea Polymer J., 9:185-96; Won et al. (2003) J. Membr. Sci., 214:245-57). Nevertheless, a strong segregation between sulfonated polystyrene and olefin blocks may be observed in numerous studies devoted to block ionomer structure (Kim et al. (2001) Korea Polymer J., 9:185-96; Schneider et al. (2006) Polymer 47:3119-31; Mauritz et al. (2002) Polymer 43:4315-23; Xu et al. (2007) Chem. Materials, 19:5937-45). Water sorption and diffusion in sPS of different sulfonation levels, mostly in acid form, have also been studied (Xu et al. (2007) Chem. Materials 19:5937-45; Brandao et al. (2005) Polymer Bull., 55:269-75; Manoj et al. (2004) Macromolecular Res., 12:26-31; Baradie et al. (1999) Macromolecular Symposia, 138:85-91; Hietala et al. (1999) J. Polymer Sci. Part B-Polymer Phys., 37:2893-900; Smitha et al. (2003) J. Membrane Sci., 225:63-76).

Regarding the protective properties of sSEBS films and composites, DMMP was found to sorb mostly inside the hydrophilic (hydrated sPS) subphase, which sorbed considerable (about 54% of the total polymer weight) amounts of the simulant at the saturation pressure (Jung et al. (2010) J. Membrane Sci., 361:63-70; Jung et al. (2010) J. Membrane Sci., 362:137-42). Moreover, in the presence of substantial amounts of DMMP or sarin, the structure of hydrated sPS becomes strongly inhomogeneous: sPS-based block ionomers are segregated on at least two scales: hydrophilic sPS is separated from hydrophobic polyolefin (the scale is determined by block length and water content), and inside the hydrophilic subphase, with cluster size of about 1-1.5 nm. DMMP and sarin diffusion accelerated fast with phosphororganic content. Accordingly, heterogeneous structure caused by contrast between hydrophilic and hydrophobic groups of phosphororganic agents is their typical behavior. In segregated PEM, their ability to interact favorably with both water and hydrophobic backbone is the main obstacle for the development of protective membranes. Their behavior is similar to small surfactant molecules, leading to high sorption and facilitated transport.

Turning to the catalytic elements of the invention, certain catalytic nanoparticles are known to cause decomposition of CWA and simulants via hydrolysis and/or oxidation. In some examples, metal-oxide nanoparticles (MONP), such as $Al_2O_3$, ZnO, MgO, CaO, $TiO_2$ and others, were shown to catalyze the hydrolysis of phosphororganic agents and mustards, as well as some Toxic Industrial Chemicals (TICs) (Sundarrajan et al. (2007) J. Materials Sci., 42:8400-07; Wagner et al. (2000) J. Phys. Chem. B, 104:5118-23; Wagner et al. (2001) J. Amer. Chem. Soc., 123:1636-44). Catalytically active polyoxometalates (POM) can be obtained as a layer on metal or metal-oxide NP and stabilize particle small size (Wang et al. (2012) Chem. Soc. Rev., 41:7479-96). Keggin-type POM such as $K_5Co^{III}W_{12}O_{40}$ were proven efficient in detection (which is based on significant color change of the POM upon reduction by the CWA) and oxidation of H-agents with air oxygen, but can also facilitate hydrolysis of V-agents (Johnson et al. (1999) J. Appl. Tox., 19:S71-S75; Mizrahi et al. (2010) J. Hazard. Mater., 179: 495-99). The detection and catalytic oxidation mechanisms suggest that POM-decorated NP should be located at the PEM surface, while MONP should be located deep inside the PEM. Provided that NP activity is not hindered by polymer and the NP surface remains accessible, toxic agents will be gradually decomposed to form non-toxic compounds that will compete against external outside CWA for preferential sorption sites. Composites with just 5% of MgO NP may be more reactive than the currently used charcoal (Sundarrajan et al. (2007) J. Materials Sci., 42:8400-07). Feasibility of modification of PEM surfaces and interior with catalyst NP is confirmed by availability of such membranes for fuel cells applications (Zhang, J. (2008) PEM Fuel Cell Electrocatalysts and Catalyst Layers: Fundamentals and Applications; Springer).

For example, nanocrystalline ZnO materials have been prepared via sol-gel method and characterized by X-ray diffraction, SEM, thermogravimetry (TGA), nitrogen adsorption and infrared spectroscopy (FTIR) (Mahato et al. (2009) J. Hazardous Mater., 165:928-32). The average crystallite size was 55 nm. Obtained material has been tested as destructive absorbent for the decontamination of sarin and the reaction may be followed by GC-NPD and GC-MS techniques. In such experiments, sarin was hydrolyzed to form surface bound non-toxic phosphonate on the surface of nano-zinc oxide. Indeed, MONPs may hydrolyze phosphororganic compounds.

Hydrolysis of phosphoroorganic compounds on MONP has been documented at the interface between MONP and vapour or a homogenous aqueous solution. The rates of decomposition of sarin and DMMP were similar in homogenously catalyzed hydrolysis, but this may be more complex at the surfaces of MONP (Falco et al. (2008) "Development of agent-simulant correlations for catalytic air purification", In CBDP, (New Orleans: DoD), t0007).

Certain membranes block H-agents in the field, including those having zeolite particles that provide satisfactory low permeability to mustard gas simulant (CEES) (Hudiono et al. (2012) Ind. Engr. Chem. Res., 51:7453-56). However, the same technology may demonstrate varying efficiency against G-agents. Because H-agents such as sulfur mustard are more hydrophobic compounds, they may be oxidized at surface of the membrane, and use different catalysts and decomposition mechanisms.

General Method for Preparing a Multicatalyst of the Invention.

The polyelectrolyte membrane (e.g., Nafion® (e.g., Nafion® 112)) may be placed in a metal salt solution (e.g., a metal nitrate) at a concentration, for example, of about 0.05 M for a period of about 24 hours. Afterwards, the film may be removed and placed in a basic solution (0.5 M NaOH) to form a metal hydroxide at 60° C. for about 6 hours. Other concentrations, different temperatures, and/or other durations of times may be used. Finally, the film may be removed from the basic solutions and converted to the metal oxide by heating to 100° C., for example, for a duration of about 24 hours.

The polyelectrolyte coating responsible for adhering the POM nanoparticles may be applied to the surface of the Nafion® membrane by a dropcasting procedure, layer-by-layer technique, spincoating, sprayed on, or any other feasible technique known in the art. Specifically, the polymer may be dropcasted onto the Nafion®.

The POM may be first dispersed in a solvent, not limited to water, methanol, ethanol, propanol (e.g., 1-propanol, 2-propanol), or others commonly known in the art, or a combination thereof, and then applied to the polyelectrolyte coating. The application of the POM may be performed by spraying (i.e., atomizing) onto the polyelectrolyte, but any other conceivable method such as dropcasting, doctor blade method, or layer-by-layer technique can be performed. The POM can be applied using these methods with the application or absence of heat, they may or may not assist in dispersing the particles. The concentration of metal and/or solvent ratio may be varied to effect the particle size and shape. The POM can also be applied directly to the Nafion®.

Alternative Synthetic Strategy for Preparing Multicatalyst Films

MC-PEM films may be fabricated to introduce the morphology and particle distributions to effect the desired protective properties.

PEM Preparation.

PEM films (e.g., Nafion® and sSEBS films) may be obtained from a variety of sources including, for example, Natick RDEC, DuPont, Ion Power (New Castle, Del.), and Kraton (Houston, Tex.), or prepared following well-established protocols (e.g., thin films may be generated by spin-coating an acetonitrile solution of block-copolymer on glass slides).

In-Situ Impregnation of PEM with MO Nanoparticles (NP) Via Sol-Gel Process.

After this, polymers may be impregnate by MONP precursors (e.g., by soaking in aqueous/ethanoloic solutions such as $Zn(NO_3)_2.6H_2O$; ZnO may be an MO catalyst) that can subsequently undergo the sol-gel reaction in situ within the pores of the polymers. Sol-gel process has been applied to the preparation of polyelectrolytes-nanoparticle composited (Li et al. (2010) J. Membrane Sci., 347:26-31; Shao et al. (1995) Chem. Materials, 7:192-200). Then, the PEM may be taken out of the precursor solution and kept in air at about 75-80° C. This will then produce ZnO nanoclusters within the pores of polymer films. By changing the concentration of the $Zn(NO_3)_2 \cdot 6H_2O$ solution, different size ZnO NPs within Nafion® or sPS may be formed. The size and amount of MONP can be controlled by varying the precursor chemistry, solvent composition, as well as polymer equivalent weight, which affects water sorption and the segregation scale. MONP will start forming in the hydrophilic subphase, but will be larger than segregation scale in Nafion®. The in-situ formation of nanoparticles may be controlled by changing the solvent composition and conditions of synthesis that allows one to tailor not only the size, but also the nanoparticle shape, giving a preference to growth of a particular crystal facet. The high-resolution TEM, SEM/EDX, UV-vis and XRD studies can confirm the homogeneous distribution of crystalline nanoparticles on the nanometer scale.

Alternative Route of Synthesis of MONP-PEM Composites.

As an alternative synthetic route, especially if fine controlled size and shapes of the MONPs are desired, the MONPs may be synthesized separately and the resulting pre-made MONPs may then be immobilized within the inside (e.g., within the hydrophilic domains) of the polymer films by using an appropriate solvent. This technique may be more appropriate to polymers with large segregation scale, such as, for example, sSEBS.

Prevention of MONP Aggregation.

To prevent MONP aggregation, which will cause loss of catalytic activity of PEM, hydrophilic polymer chains may be chemically attached to pre-synthesized MONP. Entropic repulsion between the polymer chains will reduce nanoparticle aggregation.

Introducing POM to the PEM Surface.

After synthesis of the MONP-immobilized polymer films, the outer surfaces of the material may be coated with a positively charged polymer by layer-by-layer self assembly. This can be achieved by dip-coating the polymer film in a solution containing poly(diallyldimethylammonium chloride) (PDDA Cl). Alternatively, the POMs may be mixed in instead of using dip coating. PDDA is expected to adhere strongly on the surfaces of the Nafion® or sulphonated block copolymer films through electrostatic interaction. The positively charged polymer will then allow for the deposition of the polymers in a solution of POM. The POMs of the invention will stick to the surfaces of the positively charged polymer surfaces. The polymeric materials may then be removed and washed and kept in desiccators until characterization and further use. The amount of Keggin-type POMs can be quantified by measuring the amount of the POMs in the supernatant by UV-vis spectrometry. $(NH_4)_3PW_{12}O_{40}$ POM or an A-type sandwich POM $K_9[(Fe(OH_2)_2)_3(PW_9O_{24})_2]$, which is reported to be among the best catalysts for the selective air-based oxidation of CEES under ambient conditions, may be used (Zhang et al. (1997) Inorganic Chem., 36:4381-86).

Experimental Characterization of MC-PEM Structure, and CWA Simulant Sorption, Permeation Through a Degradation in PEM-NP Composite Membranes The structure, sorption behavior, and reactivity of fabricated MC-PEM samples may be determined by a variety of different analytical methods.

The materials and their NPs may be characterized by transmission electron microscopy (TEM), powder X-ray diffraction (XRD), extended X-ray absorption fine structure (EXAFS) analysis, energy dispersive X-ray spectroscopy (EDX), and field-emission scanning electron microscopy (FE-SEM). EXAFS, in conjunction with high-angle annular dark-field SEM, may be performed.

CWA simulants sorption may be determined gravimetrically through immersion experiments such as where a sample film is periodically blotted out and weighed as a function of time (Rivin et al. (2004) J. Phys. Chem. B, 108:8900-09). Gravimetric techniques may also be utilized where a sample is exposed to simulant (DMMP, CEES) vapor and the uptake may be measured through an automated microbalance (Cahn and/or Hiden) as a function of time for each partial pressure of a simulant.

Permeation experiments may be carried out on thin films using the various cells and detectors. The film may be held in a rigid cell where one side can be challenged with a vapor, droplets, or liquid and the other side swept with a sweep stream of nitrogen to a detector for analysis. Vapor permeation experiments may be performed using a standard aerosol-vapor-liquid-assessment-group (AVLAG) cell. Experiments are typically carried out in the 32 to 35° C. range, mimicking the conditions near skin temperature. When the sample has no reactivity to the simulant, the detector is typically selected for optimum sensitivity to the simulant. The permeant traces only represent the concentration of simulant in when no reaction occurs inside the PEM (that is, controlled samples and permeation through PEM with POM attached to the surface). The permeation curve can be used to develop diffusion constants for the simulant/sample combination.

Permeation through MONP-PEM catalytic protective films may be characterized in a similar fashion, but with a different detector, which can distinguish both the simulant and multiple reaction products that are formed. A GC/MS may be utilized to separate the permeation sweep stream with the GC and analyze the individual peaks with the MS. This allows for the determination of reaction rates.

The catalytic hydrolysis of simulant may be studied by NMR experiments. The films may be introduced to the NMR sample tubes and an amount of appropriate CWA simulant is added to the tube. The disappearance of the key simulant chemical bonds indicating reactivity and the formation of new chemical bonds may be followed as a function of time to determine the rate and extent of detoxification. For example, the DMMP and decomposition products could easily be identified by NMR (Lee et al. (2011) J. Phys. Chem. B 115:13617-23). The final products and/or intermediates may be identified.

The structure and composition of the nanocatalysts after catalytic reaction or in-situ may also be characterized. After a catalytic reaction, the materials may be separated from the reaction mixture by centrifugation and analyzed by various methods. Possible aggregation or changes in the shapes and sizes of the nanoparticles may be determined by high resolution TEM and FE-SEM. The changes in the pore structure of the polymer may be analyzed by $N_2$ gas adsorption. The compositions and any changes in composition of the materials may be characterized by TGA, XRD, FTIR, XPS, EA, and/or FT-IR. Any possible changes in the oxidation states of the MONP and POMs within the samples may be characterized by X-ray absorption (XAS) and extended X-ray absorption for fine structure (EXAFS). The distribution of the NPs may be analyzed by using EDX based elemental mapping, electron energy loss spectroscopy (EELS), and/or micro-Raman spectroscopy. The permeation experiments serve as a test of the MC-PEM membranes, but sorption and permeation results interpreted in the frame of theoretical models also provide valuable information of reaction diffusion mechanisms, reaction rate, and the efficiency of catalytic MONP imbedded in the polyelectrolyte matrix.

A number of patent and non-patent publications may be cited herein in order to describe the state of the art to which this invention pertains. The entire disclosure of each of these publications is incorporated by reference herein.

While certain embodiments of the present invention have been described and/or exemplified above, various other embodiments will be apparent to those skilled in the art from the foregoing disclosure. The present invention is, therefore, not limited to the particular embodiments described and/or exemplified, but is capable of considerable variation and modification without departure from the scope and spirit of the appended claims.

Moreover, as used herein, the term "about" means that dimensions, sizes, formulations, parameters, shapes and other quantities and characteristics are not and need not be exact, but may be approximate and/or larger or smaller, as desired, reflecting tolerances, conversion factors, rounding off, measurement error and the like, and other factors known to those of skill in the art. In general, a dimension, size, formulation, parameter, shape or other quantity or characteristic is "about" or "approximate" whether or not expressly stated to be such. It is noted that embodiments of very different sizes, shapes and dimensions may employ the described arrangements.

Furthermore, the transitional terms "comprising", "consisting essentially of" and "consisting of", when used in the appended claims, in original and amended form, define the claim scope with respect to what unrecited additional claim elements or steps, if any, are excluded from the scope of the claim(s). The term "comprising" is intended to be inclusive or open-ended and does not exclude any additional, unrecited element, method, step or material. The term "consisting of" excludes any element, step or material other than those specified in the claim and, in the latter instance, impurities ordinary associated with the specified material(s). The term "consisting essentially of" limits the scope of a claim to the specified elements, steps or material(s) and those that do not materially affect the basic and novel characteristic(s) of the claimed invention. All materials, manufactures, and methods described herein that embody the present invention can, in alternate embodiments, be more specifically defined by any of the transitional terms "comprising," "consisting essentially of," and "consisting of."

What is claimed is:

1. A multi-catalytic material, comprising:
   a. a polyelectrolyte membrane (PEM), wherein the polyelectrolyte membrane comprises sulfonated styrene-ethylene/butadiene-styrene (sSEBS) or a combination of sSEBS and sulfonated tetrafluoroethylene fluoropolymer-copolymer, and wherein the polyelectrolyte membrane is coated with a positively charged polyelectrolyte;
   b. polyoxometalate (POM) nanoparticles, wherein the polyoxometalate nanoparticles comprise $K_5Co^{III}W_{12}O_{40}$, $K_9[(Fe(H_2O)_2)_3(PW_9O_{24})_2]$, $V_2Mo_{10}O_{40}$, $(NH_4)_3PW_{12}O_{40}$ or a combination thereof; wherein the polyoxometalate nanoparticles are adhered to a surface of the polyelectrolyte membrane coated by the positively charged polyelectrolyte; and
   c. metal oxide (MO) nanoparticles, wherein the metal oxide nanoparticles are within the polyelectrolyte membrane, and wherein the metal oxide is selected from the group consisting of $Al_2O_3$, $ZnO$, $MgO$, $CaO$, $TiO_2$, $Co_2O_3$, $Fe_2O_3$, $NiO$, $Ni_2O_3$, $Ag_2O$, $AgO$, $Ag_2O_3$, $CoO$, $Co_2O_3$, $Co_3O_4$, and combinations thereof.

2. The multi-catalytic material of claim 1, wherein said positively charged polyelectrolyte is poly(diallyldimethylammonium).

3. The material of claim 1, wherein the polyelectrolyte membrane comprises sulfonated styrene-ethane/butadiene-styrene (sSEBS).

4. The material of claim 1, wherein the metal oxide nanoparticles comprise clusters, alloys, core-shell particles, or a combination thereof.

5. The material of claim 1, wherein the material comprises a hydrophobic subphase, a hydrophilic subphase, or a combination thereof.

6. The material of claim 1, comprising a polymeric layer configured to overlay a surface of the material.

7. The material of claim 1, wherein the material is configured to decompose a chemical warfare agent.

8. The material of claim 7, wherein the chemical warfare agent comprises a G-agent, an H-agent, a V-agent, or a combination thereof.

9. The material of claim 8, wherein the H-agent comprises sulfur mustard, 2-chloroethyl ethylsulfide (CEES), or a combination thereof.

10. The material of claim 8, wherein the V-agent comprises S-[2-(diethylamino)ethyl] O-ethyl ethylphosphonothioate, S-[2-(diethylamino)ethyl] O-ethyl methylphosphonothioate, 3-pyridyl 3,3,5-trimethylcyclohexyl methylphosphonate, O-isobutyl S-(2-diethaminoethyl) methylphosphothioate, ethyl ({2-[bis(propan-2-yl)amino]ethyl}sulfanyl)(methyl)phosphinate (VX), O,O-diethyl-S-[2-(diethylamino)ethyl] phosphorothioate, or a combination thereof.

11. The material of claim 8, wherein the G-agent comprises tabun, sarin, soman, cyclosarin, ethyl sarin, O-isopentyl sarin, 2-(dimethylamino)ethyl N,N-dimethylphosphoramidofluoridate, or a combination thereof.

12. The material of claim 7, wherein the chemical warfare agent comprises, diisopropyl fluorophosphonate, dimethylmethylphosphonate, malathion, or a combination thereof.

13. The material of claim 1, wherein an interior portion of the material is configured to hydrolyze a molecule.

14. The material of claim 1, wherein an exterior portion of the material is configured to oxidize a molecule.

15. The material of claim 1, wherein the material is configured to transmit water vapor through the material.

16. The material of claim 1, further comprising a plasticizer.

17. The material of claim 1, further comprising a conductive material.

18. A self-decontaminating protective cloth comprising a multi-catalytic material as recited in claim 1.

19. The cloth of claim 18, wherein said multi-catalytic material is coated on a fabric.

20. The cloth of claim 18, wherein the cloth is configured to decompose a chemical warfare agent and transmit water vapor through the clothing.

21. The cloth of claim 20, wherein the chemical warfare agent comprises a G-agent, an H-agent, a V-agent, or a combination thereof.

22. The cloth of claim 21, wherein the H-agent comprises sulfur mustard, 2-chloroethyl ethyl sulfide (CEES), or a combination thereof.

23. The cloth of claim 21, wherein the V-agent comprises 5-[2-(diethylamino)ethyl] O-ethyl ethylphosphonothioate, S-[2-(diethylamino)ethyl] O-ethyl methylphosphonothioate, 3-pyridyl 3,3,5-trimethylcyclohexyl methylphosphonate, O-isobutyl S-(2-diethaminoethyl) methylphosphothioate, Ethyl ({2-[bis(propan-2-yl)amino]ethyl}sulfanyl)(methyl)

phosphinate (VX), O,O-diethyl-S-[2-(diethylamino)ethyl] phosphorothioate, or a combination thereof.

24. The cloth of claim 21, wherein the G-agent comprises tabun, sarin, soman, cyclosarin, ethyl sarin, O-isopentyl sarin, 2-(Dimethylamino)ethyl N,N-dimethylphosphoramidofluoridate, or a combination thereof.

25. The cloth of claim 20, wherein the chemical warfare agent comprises, disopropyl fluorophosphonate, dimethylmethylphosphonate, malathion, or a combination thereof.

* * * * *

UNITED STATES PATENT AND TRADEMARK OFFICE
CERTIFICATE OF CORRECTION

PATENT NO. : 10,722,743 B2
APPLICATION NO. : 15/154219
DATED : July 28, 2020
INVENTOR(S) : John Landers et al.

Page 1 of 1

It is certified that error appears in the above-identified patent and that said Letters Patent is hereby corrected as shown below:

In the Specification

At Column 1, Line 10:
Please delete "HDTRA 1-11-16-BRCWMD-BAA" and insert therefor --HDTRA1-14-1-0015--

Signed and Sealed this
Thirteenth Day of July, 2021

Drew Hirshfeld
*Performing the Functions and Duties of the*
*Under Secretary of Commerce for Intellectual Property and*
*Director of the United States Patent and Trademark Office*